United States Patent
Kang et al.

(10) Patent No.: US 10,254,788 B2
(45) Date of Patent: Apr. 9, 2019

(54) PLASTIC FILM

(71) Applicant: LG CHEM, LTD., Seoul (KR)

(72) Inventors: Joon Koo Kang, Daejeon (KR); Hang Suk Choi, Daejeon (KR); Soon Hwa Jung, Daejeon (KR); Hyeok Jeong, Daejeon (KR); Eun Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 283 days.

(21) Appl. No.: 15/037,361

(22) PCT Filed: Nov. 19, 2014

(86) PCT No.: PCT/KR2014/011144
§ 371 (c)(1),
(2) Date: May 18, 2016

(87) PCT Pub. No.: WO2015/076566
PCT Pub. Date: May 28, 2015

(65) Prior Publication Data
US 2016/0282902 A1    Sep. 29, 2016

(30) Foreign Application Priority Data

Nov. 19, 2013  (KR) .......... 10-2013-0140663
Nov. 18, 2014  (KR) .......... 10-2014-0161178

(51) Int. Cl.
*G06F 1/16*   (2006.01)
*B32B 7/02*   (2006.01)
(Continued)

(52) U.S. Cl.
CPC .............. *G06F 1/1613* (2013.01); *B32B 7/02* (2013.01); *B32B 7/12* (2013.01); *B32B 15/02* (2013.01);
(Continued)

(58) Field of Classification Search
CPC .. B32B 27/00–27/42; B32B 7/02; B32B 7/12; C08J 7/042; C08J 4/00; C08J 4/06; C09D 133/00–133/12; C09D 167/04
See application file for complete search history.

(56) References Cited

U.S. PATENT DOCUMENTS 6,489,015 B1    12/2002  Tsuchiya et al.
2007/0231578 A1  10/2007  Osada et al.
(Continued)

FOREIGN PATENT DOCUMENTS

EP    2857440 A1    4/2015
JP    2000-071392 A  3/2000
(Continued)

OTHER PUBLICATIONS

Machine translation of JP2009079163. Retrieved Apr. 12, 2018.*
(Continued)

*Primary Examiner* — Prashant J Khatri
(74) *Attorney, Agent, or Firm* — Rothwell, Figg, Ernst & Manbeck, P.C.

(57) ABSTRACT

The present invention relates to a plastic film, and more specifically, the present invention relates to a plastic film showing impact resistance and excellent properties. According to the present invention, the plastic film showing high hardness, impact resistance, scratch resistance, and transparency and having excellent processability can be provided.

19 Claims, 1 Drawing Sheet

(51) Int. Cl.

| | |
|---|---|
| *B32B 27/36* | (2006.01) |
| *C08G 83/00* | (2006.01) |
| *C09D 133/08* | (2006.01) |
| *C09D 167/04* | (2006.01) |
| *B32B 27/06* | (2006.01) |
| *C08J 7/04* | (2006.01) |
| *C09J 4/00* | (2006.01) |
| *C09J 4/06* | (2006.01) |
| *B32B 7/12* | (2006.01) |
| *B32B 15/02* | (2006.01) |
| *B32B 15/08* | (2006.01) |
| *B32B 23/08* | (2006.01) |
| *B32B 27/08* | (2006.01) |
| *B32B 27/28* | (2006.01) |
| *B32B 27/30* | (2006.01) |
| *B32B 27/32* | (2006.01) |

(52) U.S. Cl.
CPC ............ *B32B 15/08* (2013.01); *B32B 23/08* (2013.01); *B32B 27/06* (2013.01); *B32B 27/08* (2013.01); *B32B 27/28* (2013.01); *B32B 27/281* (2013.01); *B32B 27/288* (2013.01); *B32B 27/306* (2013.01); *B32B 27/308* (2013.01); *B32B 27/32* (2013.01); *B32B 27/322* (2013.01); *B32B 27/325* (2013.01); *B32B 27/36* (2013.01); *C08G 83/007* (2013.01); *C08J 7/042* (2013.01); *C09D 133/08* (2013.01); *C09D 167/04* (2013.01); *C09J 4/00* (2013.01); *C09J 4/06* (2013.01); *B32B 2255/10* (2013.01); *B32B 2255/26* (2013.01); *B32B 2255/28* (2013.01); *B32B 2270/00* (2013.01); *B32B 2307/202* (2013.01); *B32B 2307/412* (2013.01); *B32B 2307/414* (2013.01); *B32B 2307/536* (2013.01); *B32B 2307/558* (2013.01); *B32B 2307/584* (2013.01); *B32B 2457/20* (2013.01); *C08J 2300/22* (2013.01); *C08J 2367/02* (2013.01); *C08J 2400/21* (2013.01); *C08J 2433/08* (2013.01); *C08J 2433/10* (2013.01)

(56) References Cited

U.S. PATENT DOCUMENTS

| | | |
|---|---|---|
| 2007/0291367 A1 | 12/2007 | Hamamoto et al. |
| 2013/0177748 A1 | 7/2013 | Hirai et al. |
| 2014/0335337 A1 | 11/2014 | Lee et al. |

FOREIGN PATENT DOCUMENTS

| | | | |
|---|---|---|---|
| JP | 2008-075092 A | | 4/2008 |
| JP | 2009079163 A | * | 4/2009 |
| JP | 2009-204725 A | | 9/2009 |
| JP | 4872893 B2 | | 2/2012 |
| JP | 2012-219132 A | | 11/2012 |
| JP | 2013-123825 A | | 6/2013 |
| KR | 10-2004-0037081 A | | 5/2004 |
| KR | 10-2008-0109658 A | | 12/2008 |
| KR | 10-2010-0041992 A | | 4/2010 |
| KR | 10-2010-0055160 A | | 5/2010 |
| KR | 10-2010-0129512 A | | 12/2010 |
| KR | 10-1199641 B1 | | 11/2012 |
| KR | 10-2013-0068800 A | | 6/2013 |
| KR | 10-1295325 B1 | | 8/2013 |
| TW | I225159 B | | 12/2004 |

OTHER PUBLICATIONS

"Materials Data Book". Cambridge University Engineering Department, (2003); pp. 1-37.*

International Search Report issued for International Application No. PCT/KR2014/011144 dated Mar. 13, 2015 (2 pages).

Extended European Search Report issued for European Patent Application No. 14864335.6 dated Jun. 12, 2017, 8 pages.

* cited by examiner

PLASTIC FILM

CROSS-REFERENCE TO RELATED APPLICATIONS

This application is a 35 U.S.C. § 371 National Phase Entry Application from PCT/KR2014/011144, filed on Nov. 19, 2014, and designating the United States, which claims priority under 35 U.S.C. § 119 to Korean Patent Application No. 10-2013-0140663, filed on Nov. 19, 2013, and Korean Patent Application No. 10-2014-0161178, filed on Nov. 18, 2014, the entire contents of which are incorporated herein by reference.

BACKGROUND OF THE INVENTION

(a) Field of the Invention

The present invention relates to a plastic film laminate. More specifically, the present invention relates to a plastic film laminate showing high hardness and excellent properties.

(b) Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of being heavy and being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a certain thickness to ensure the surface hardness sufficient to replace glass. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on plastic films, without the problems of cracking and setting shrinkage-induced curling.

Korean Patent Application Publication No. 2010-0041992 discloses a coating composition, free of monomers, comprising a binder resin based on ultraviolet-curable polyurethane acrylate oligomers. However, the film formed from said coating composition has a pencil hardness of about 3H, and thus the strength thereof is not sufficient to be a substitute for glass panels for displays.

SUMMARY OF THE INVENTION

Accordingly, the present invention provides a plastic film which exhibits high hardness and excellent properties, for resolving the problems.

In accordance with an aspect thereof, the present invention provides a plastic film, including:
a supporting substrate;
a first coating layer which is formed on one side of the supporting substrate and has an elastic modulus of 1,500 MPa or less;
a second coating layer which is formed on another side of the supporting substrate and has an elastic modulus of 2,000 MPa or more; and
at least one layer selected from a third coating layer located between the supporting substrate and the first coating layer and a fourth layer located between the supporting substrate and the second coating layer.

According to the present invention, the plastic film shows high hardness, impact resistance, scratch resistance, and transparency, and it can be usefully applied to touch panels of mobile terminals, smart phones or tablet PCs, and as a cover or device panel for various displays.

DETAILED DESCRIPTION OF THE EMBODIMENTS

The plastic film of the present invention includes:
a supporting substrate;
a first coating layer which is formed on one side of the supporting substrate and has an elastic modulus of 1,500 MPa or less;
a second coating layer which is formed on another side of the supporting substrate and has an elastic modulus of 2,000 MPa or more; and
at least one layer selected from a third coating layer located between the supporting substrate and the first coating layer and a fourth layer located between the supporting substrate and the second coating layer.

Furthermore, all of the terms used in the specification are taken only to illustrate embodiments, and are not intended to limit the present invention. As used herein and in the appended claims, the singular forms "a", "an", and "the" include plural reference unless the context clearly dictates otherwise.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the present invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, the plastic film of the present invention is explained in more detail.

According to the present invention, a plastic film including a supporting substrate; a first coating layer which is formed on one side of the supporting substrate and has an elastic modulus of 1,500 MPa or less; a second coating layer which is formed on another side of the supporting substrate and has an elastic modulus of 2,000 MPa or more; and at least one layer selected from a third coating layer located between the supporting substrate and the first coating layer and a fourth coating layer located between the supporting substrate and the second coating layer is provided.

In the plastic film of the present invention, so long as it is transparent, any plastic resin, whether capable of being stretched or not, may be used for the supporting substrate on which the first to the fourth coating layers are formed, without limitations imposed thereto. According to one embodiment of the present invention, the supporting substrate may include, for example, a polyester such as polyethyleneterephtalate (PET), a polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), or a fluoro-polymer. The substrate may be a single layer structure, and, if necessary, may be a multilayer structure including two or more layers composed of the same or different materials, but is not particularly limited.

According to one embodiment of the present invention, the supporting substrate may be a multilayer substrate made of polyethyleneterephthalate (PET) or a two-layer substrate formed by coextrusion of polymethylmethacrylate (PMMA)/polycarbonate (PC).

Furthermore, according to one embodiment of the present invention, the supporting substrate may be a substrate including a copolymer of polymethylmethacrylate (PMMA) and polycarbonate (PC).

The thickness of the supporting substrate may be about 30 to about 1,200 μm, or about 50 to about 800 μm, but is not limited thereto.

At first, the plastic film of the present invention includes the first coating layer and the second coating layer which are respectively formed on both sides of the supporting substrate.

The first coating layer and the second coating layer may be directly contacted to one surface of the supporting substrate respectively, or other layers or membranes may be further included between the first coating layer and the supporting substrate or between the second coating layer and the supporting substrate in addition.

In the plastic film of the present invention, the first coating layer has an elastic modulus of 1,500 MPa or less and the second coating layer has an elastic modulus of 2,000 MPa or more.

Throughout the specification, "elastic modulus" means a value measured according to ASTM D882.

Namely, the plastic film of the present invention is a laminated form of the supporting substrate and at least two layers having different elastic moduli laminated on both sides of the supporting substrate, wherein the elastic modulus of the second coating layer is at least 500 MPa larger than the elastic modulus of the first coating layer. Therefore, the second coating layer having high elastic modulus of 2,000 MPa or more exhibits high mechanical strength such as high hardness and so on, and the first coating layer having relatively low elastic modulus of 1,500 MPa or less may exhibit impact resistance and fold endurance. Since the plastic film of the present invention includes two coating layers having different elastic moduli which are laminated on both sides of the supporting substrate, it is less prone to curling or cracking while having high physical strength sufficient to be a substitute for glass and thus it can show high processability.

According to one embodiment of the present invention, the elastic modulus of the first coating layer may be about 1,500 MPa or less, for example, about 300 to about 1,500 MPa, or about 300 to about 1,200 MPa, or about 300 to about 1,000 MPa, and the elastic modulus of the second coating layer may be about 2,000 MPa or more, for example, about 2,000 to about 3,500 MPa, or about 2,000 to about 3,000 MPa, or about 2,000 to about 2,800 MPa.

Furthermore, according to one embodiment of the present invention, the difference between the elastic moduli of the first coating layer and the second coating layer may be about 500 MPa or more, for example, about 500 to about 3,000 MPa, or about 500 to about 2,500 MPa, or about 500 to about 2,000 MPa.

When the elastic moduli of the first and the second coating layers and the difference between them are in said range, the plastic film is less prone to curling or cracking while having high physical strength sufficient to be a substitute for glass and thus it can show high hardness and high impact resistance.

The plastic film of the present invention may further include at least one layer selected from the third coating layer located between the supporting substrate and the first coating layer and the fourth coating layer located between the supporting substrate and the second coating layer, in addition to the first and the second coating layers.

Therefore, the plastic film of the present invention may be a laminate film including three laminated coating layers of the first, the second, and the third coating layers or the first, the second, and the fourth coating layers, or a multilayer plastic film including four laminated layers of the first to the fourth coating layers.

The elastic moduli of the third and the fourth coating layers may be relative to the elastic moduli of the first and the second coating layers.

Namely, according to one embodiment of the present invention, the elastic modulus of the third coating layer may be equal to or more than the elastic modulus of the first coating layer. And, the elastic modulus of the fourth coating layer may be equal to or less than the elastic modulus of the second coating layer.

The difference between the elastic moduli of the first and the third coating layers is not limited particularly if it is 0 MPa or more, and, for example, it may be about 0 to about 2,000 MPa, or about 0 to about 1,000 MPa, or about 0 to about 500 MPa. Furthermore, the difference between the elastic moduli of the second and the fourth coating layers is also not limited particularly if it is 0 MPa or more, and, for example, it may be about 0 to about 2,000 MPa, or about 0 to about 1,000 MPa, or about 0 to about 500 MPa.

According to one embodiment of the present invention, the difference between the elastic moduli of the first and the third coating layers may be 0 MPa or more and the third coating layer may have the elastic modulus of about 2,000 MPa or less at the same time. More specifically, the elastic modulus of the third coating layer may be about 2,000 MPa or less, for example, about 300 to about 2,000 MPa, or about 300 to about 1,500 MPa, or about 300 to about 1,000 MPa.

According to another embodiment of the present invention, the difference between the elastic moduli of the second and the fourth coating layers may be 0 MPa or more and the fourth coating layer may have the elastic modulus of about 1,500 MPa or more at the same time. More specifically, the elastic modulus of the fourth coating layer may be about 1,500 MPa or more, for example, about 1,500 to about 3,500 MPa, or about 1,500 to about 3,000 MPa, or about 1,500 to about 2,800 MPa.

Figure 1:
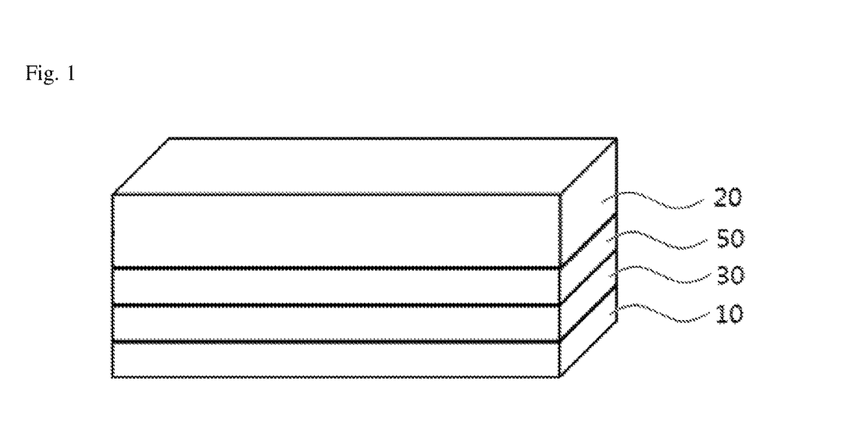
FIG. 1 is a drawing illustrating the plastic film according to one embodiment of the present invention.
Figure 2:
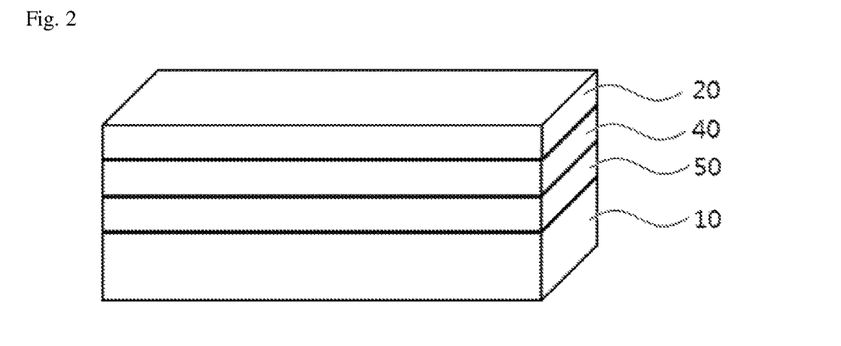
FIG. 2 is a drawing illustrating the plastic film according to one embodiment of the present invention.
Figure 3:
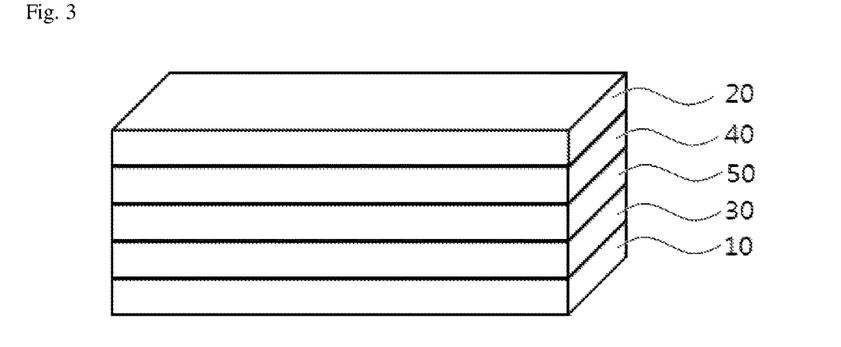
FIG. 3 is a drawing illustrating the plastic film according to one embodiment of the present invention.

FIGS. 1 to 3 are drawings respectively illustrating the plastic films according to the embodiments of the present invention.

Referring to FIG. 1, the plastic film of the present invention includes a supporting substrate 50, the first coating layer 10, the second coating layer 20, and the third coating layer 30. At this time, the first coating layer 10 and the second coating layer 20 are formed on both sides of the supporting substrate 50 and the third coating layer 30 is formed between the first coating layer 10 and the supporting substrate 50.

Referring to FIG. 2, the plastic film of the present invention includes a supporting substrate 50, the first coating layer 10, the second coating layer 20, and the fourth coating layer 40. At this time, the first coating layer 10 and the second coating layer 20 are formed on both sides of the supporting substrate 50 and the fourth coating layer 40 is formed between the second coating layer 20 and the supporting substrate 50.

Referring to FIG. 3, the plastic film of the present invention includes a supporting substrate 50, the first coating layer 10, the second coating layer 20, the third coating layer 30, and the fourth coating layer 40. At this time, the first coating layer 10 and the second coating layer 20 are formed on both sides of the supporting substrate 50, and the third coating layer 30 is formed between the first coating layer 10 and the supporting substrate 50 and the fourth coating layer 40 is formed between the second coating layer 20 and the supporting substrate 50.

The materials composing the first to the fourth coating layers are not limited particularly as long as the conditions for the elastic moduli disclosed above are satisfied but, according to one embodiment of the present invention, the first to the fourth coating layers may independently include a photo-curable crosslinking copolymer of a photo-curable elastic polymer and a 3- to 6-functional acrylate monomer equally or differently.

The photo-curable crosslinking copolymer may be a crosslinking copolymer of the 3- to 6-functional acrylate monomer and the photo-curable elastic polymer.

As used herein, the term "acrylate" is intended to encompass acrylate, methacrylate, and derivatives thereof with various substituents.

As used herein, the term "photo-curable elastic polymer" refers to a polymer which is of elasticity and contains a functional group that undergoes UV light-triggered crosslink polymerization.

According to one embodiment of the present invention, the photo-curable elastic polymer may have an elongation of about 15% or more, for example, about 15 to about 200%, or about 20 to about 200%, or about 20 to about 150%, as measured according to ASTM D638. When the photo-curable elastic polymer having the elongation of above range is used, it is possible to form the coating layers satisfying all of high hardness and high impact resistance.

The photo-curable elastic polymer is crosslink-polymerized with the 3- to 6-functional acrylate monomer and then cured to form the first to the fourth coating layers, and the flexibility and the impact resistance suitable for the first to the fourth coating layer may be obtained according to the content thereof.

According to one embodiment of the present invention, the photo-curable elastic polymer may be a polymer or oligomer having a weight average molecular weight of about 1,000 to about 600,000 g/mol or about 10,000 to about 600,000 g/mol.

The photo-curable elastic polymer may be at least one selected from the group consisting of polycaprolactone, urethane acrylate polymers, and polyrotaxane, for example.

Among the polymers used as the photo-curable elastic polymer, the polycaprolactone is formed by the ring-opening polymerization of caprolactone, and has excellent physical properties such as flexibility, impact resistance, durability and the like.

The urethane acrylate polymer includes urethane bonds and has excellent elasticity and durability.

The polyrotaxane is a polymer composed of dumbbell-shaped molecules and cyclic compounds (macrocycle) which are structurally interlocked. The dumbbell-shaped molecule includes a certain linear molecule and stopper groups placed at both ends of the linear molecule and the linear molecule passes through the inside of the macrocycle, and the macrocycle can move along the linear molecule and is prevented by the stopper groups from dissociation.

According to one embodiment of the present invention, the photo-curable elastic polymer may include a rotaxane compound including a macrocycle connected with a lactone compound with a (meth)acrylate moiety introduced to the end thereof; a linear compound passing through the macrocycle; and the stopper groups placed at both ends of the linear compound so as to prevent the macrocycle from dissociation.

No particular limitations are imposed on the macrocycle if it is large enough to pass or surround the linear molecule. The macrocycle may include a functional group such as a hydroxide group, an amino group, a carboxyl group, a thiol group, an aldehyde group or the like, which can react with other polymers or compounds. Specific examples of the macrocycle may be α-cyclodextrin, β-cyclodextrin, γ-cyclodextrin and mixtures thereof.

Furthermore, any compound of linear form having regular molecular weight or more may be used as the linear molecule without restriction, and polyalkylene compounds or polylactone compounds may be used. Specifically, polyoxyalkylene compounds including $C_1$-$C_8$ oxyalkylene repeating units or polylactone compounds including $C_3$-$C_{10}$ lactone repeating units may be used.

Meanwhile, the stopper group may be appropriately adjusted depending on the characteristics of the rotaxane compound to be prepared. For example, the stopper group may be at least one selected from the group consisting of a dinitrophenyl group, a cyclodextrin group, an adamantane group, a trityl group, a fluorescein group, and a pyrene group.

In the plastic film of the present invention, since the first to the fourth coating layers are photo-cured with including the photo-curable elastic polymer, high hardness and flexibility can be provided to the first to the fourth coating layers and particularly it is possible to ensure excellent impact resistance by preventing the damage by an external impact.

For example, said 3- to 6-functional acrylate monomer may be trimethylolpropane triacrylate (TMPTA), trimethylolpropaneethoxy triacrylate (TMPEOTA), glycerinpropoxylated triacrylate (GPTA), pentaerythritol tetraacrylate (PETA), dipentaerythritol hexaacrylate (DPHA), and the like. These 3- to 6-functional acrylate monomers may be used alone or in combination.

The photo-curable crosslinking copolymer may be a copolymer in which the photo-curable elastic polymer is crosslinked with said 3- to 6-functional acrylate monomer.

According to one embodiment of the present invention, the photo-curable crosslinking copolymer may be a copolymer in which 5 to 20 parts by weight of the photo-curable elastic polymer and 80 to 95 parts by weight of the 3- to 6-functional acrylate monomer is crosslinked, or 20 to 40 parts by weight of the photo-curable elastic polymer and 60 to 80 parts by weight of the 3- to 6-functional acrylate monomer is crosslinked, or 40 to 80 parts by weight of the photo-curable elastic polymer and 20 to 60 parts by weight of the 3- to 6-functional acrylate monomer is crosslinked, based on 100 parts by weight of the photo-curable crosslinking copolymer.

As disclosed above, the first to the fourth coating layers can show a good property of harmonized high impact resistance and hardness by controlling the content of the photo-curable elastic polymer having high elasticity. For example, the first coating layer can exhibit high elasticity and impact resistance by including relatively high content of the photo-curable elastic polymer, and the second coating layer can exhibit high hardness by including relatively low content of the photo-curable elastic polymer in reverse.

According to one embodiment of the present invention, the first coating layer may include a copolymer in which 40 to 80 parts by weight of the photo-curable elastic polymer and 20 to 60 parts by weight of the 3- to 6-functional acrylate monomer is crosslinked. And, the second coating layer may include a copolymer in which 5 to 20 parts by weight of the photo-curable elastic polymer and 80 to 95 parts by weight of the 3- to 6-functional acrylate monomer is crosslinked. And, the third coating layer may include a copolymer in which 20 to 40 parts by weight of the photo-curable elastic polymer and 60 to 80 parts by weight of the 3- to 6-functional acrylate monomer is crosslinked. And, the fourth coating layer may include a copolymer in which 20 to 40 parts by weight of the photo-curable elastic polymer and 60 to 80 parts by weight of the 3- to 6-functional acrylate monomer is crosslinked. However, the present invention is not limited to or by this, and the materials and the content included therein are not limited if the elastic moduli of the first to the fourth coating layers satisfy said range.

According to another embodiment of the present invention, the photo-curable crosslinking copolymer may be a crosslinking copolymer in which a 1- to 2-functional acrylate monomer is further crosslinked in addition to the 3- to 6-functional acrylate monomer and the photo-curable elastic polymer.

For example, said 1- to 2-functional acrylate monomer may be hydroxyethylacrylate (HEA), hydroxyethylmethacrylate (HEMA), hexanedioldiacrylate (HDDA), tripropyleneglycoldiacrylate (TPGDA), ethyleneglycoldiacrylate (EGDA), and the like. The 1- to 2-functional acrylate monomer also may be used alone or in combination.

Furthermore, in the plastic film of the present invention, the first to the fourth coating layers may further include inorganic particles dispersed in the photo-curable crosslinking copolymer, independently equally or differently.

According to one embodiment of the present invention, the inorganic particle may have a particle size of nanoscale. For example, inorganic particles having the particle size of about 100 nm or less, about 10 to about 100 nm, or about 10 to about 50 nm may be used. And, for example, silica particles, aluminum oxide particles, titanium oxide particles, or zinc oxide particles may be used as the inorganic particles.

The hardness of the plastic film can be more improved by including the inorganic particles. Particularly, it may be preferable that the second coating layer, the outermost layer, includes the inorganic particles, for improving the surface hardness.

According to one embodiment of the present invention, in the case of that the first to the fourth coating layers include the inorganic particles, the first to the fourth coating layers may include about 40 to about 90 parts by weight of the photo-curable crosslinking copolymer and about 10 to about 60 parts by weight of the inorganic particles, or about 50 to about 80 parts by weight of the photo-curable crosslinking copolymer and about 20 to about 50 parts by weight of the inorganic particles, based on 100 parts by weight of the first to the fourth coating layers. The plastic film having excellent properties can be formed by including the photo-curable crosslinking copolymer and the inorganic particles with said content range.

According to one embodiment of the present invention, the first to the fourth coating layers may have the thickness of 50 μm or more, for example, the thickness of about 50 to about 300 μm, or about 50 to about 200 μm, or about 50 to about 150 μm, or about 70 to about 150 μm. The thicknesses of the first to the fourth coating layers may be independently same to or different from each other.

At this time, the thicknesses of the coating layers coated on both sides of the supporting substrate with the same as the center may be in the same range respectively, regardless of the number of the coating layers. More preferably, the total thicknesses of the coating layers coated on both sides of the supporting substrate with the same as the center may show the difference of about 50% or less, or about 30% or less.

Namely, when the plastic film of the present invention is a plastic film including the first and the third coating layers on one side of the substrate and the second coating layer on the other side of the substrate, the sum of the thicknesses of the first and the third coating layers may be about 50 to about 300 μm, or about 50 to about 200 μm, or about 50 to about 150 μm, or about 70 to about 150 μm, and the thickness of the second coating layer may be about 50 to about 300 μm, or about 50 to about 200 μm, or about 50 to about 150 μm, or about 70 to about 150 μm. At this time, the ratio of the thicknesses of the first coating layer and the third coating layer may be 99:1 to 5:5, or about 7:3 to about 5:5.

And, when the plastic film of the present invention is a plastic film including the first coating layer on one side of the substrate and the second and the fourth coating layers on the other side of the substrate, the sum of the thicknesses of the second and the fourth coating layers may be about 50 to about 300 μm, or about 50 to about 200 μm, or about 50 to about 150 μm, or about 70 to about 150 μm, and the thickness of the first coating layer may be about 50 to about 300 μm, or about 50 to about 200 μm, or about 50 to about 150 μm, or about 70 to about 150 μm. At this time, the ratio of the thicknesses of the second coating layer and the fourth coating layer may be 99:1 to 5:5, or about 7:3 to about 5:5.

And, when the plastic film of the present invention is a plastic film including the first and the third coating layers on one side of the substrate and the second and the fourth coating layers on the other side of the substrate, the sum of the thicknesses of the second and the fourth coating layers may be about 50 to about 300 μm, or about 50 to about 200 μm, or about 50 to about 150 μm, or about 70 to about 150 μm, and the sum of the thicknesses of the first and the third coating layers may be about 50 to about 300 μm, or about 50 to about 200 μm, or about 50 to about 150 μm, or about 70 to about 150 μm. At this time, the ratio of the thicknesses of the first coating layer and the third coating layer may be 99:1 to 5:5, or about 7:3 to about 5:5 and the ratio of the thicknesses of the second coating layer and the fourth coating layer may be 99:1 to 5:5, or about 7:3 to about 5:5.

Meanwhile, the first to the fourth coating layers may further include typical additives used in the art to which the present invention pertains such as a surfactant, a yellowing inhibitor, a leveling agent, an antifouling agent and the like in addition to the photo-curable crosslinking copolymer and the inorganic particles. Here, the content of the additives may be variously adjusted to the degree that the physical properties of the plastic film of the present invention are not deteriorated and thus its content is not particularly limited but, for example, about 0.1 to 10 parts by weight of the additives may be included therein, based on 100 parts by weight of the photo-curable crosslinking copolymer.

According to one embodiment of the present invention, for example, the first to the fourth coating layers may include a surfactant as an additive. The surfactant may be a 1- or 2-functional fluorine acrylate, a fluorine surfactant, or a silicon surfactant. In this context, the surfactant may be contained in a dispersed or crosslinked form in the crosslinking copolymer. Furthermore, the coating layers may include a yellowing inhibitor as an additive. The yellowing inhibitor may be a benzophenone-based compound or a benzotriazole-based compound.

The first to the fourth coating layers may be formed by coating the first to the fourth coating compositions and photo-curing the same respectively, wherein the first to the fourth coating compositions independently include the 3- to 6-functional acrylate monomer, the photo-curable elastic polymer, and a photoinitiator, and optionally the 1- to 2-functional acrylate monomer, the inorganic particles, organic solvents, and additives, equally or differently.

Examples of the photoinitiator may include, but are not limited to or by them, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, $\alpha,\alpha$-dimethoxy-$\alpha$-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Furthermore, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

Examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

The solid content in the first to the fourth coating compositions includes the 3- to 6-functional acrylate monomer, the photo-curable elastic polymer, the photoinitiator, and other additives, and the weight ratio of the solid content and the solvent may be about 70:30 to about 99:1. When the first to the fourth coating compositions have a high solid content, the viscosity of the compositions may increase and it makes it possible to form a thick coating layer, and thus the first to the fourth coating layers having high thickness can be obtained therefrom.

The plastic film of the present invention may further include at least one layer, membrane, or film, such as a plastic resin film, an adhesive film, a release film, a conductive film, a conductive layer, a coating layer, a curable resin layer, a non-conductive film, a metal mesh layer, or a patterned metal layer on at least one of the first coating layer and the second coating layer. In addition, the layer, membrane, or film may be any form of a monolayer, a bilayer or a lamination. The layer, membrane, or film may be formed on the coating layers by laminating a freestanding film with the aid of an adhesive or an adhesive film, or by the method of coating, deposition, or sputtering, but it is not limited to or by them.

Particularly, said other layer, membrane, or film may be formed to contact directly with the first coating layer for protecting said other layer, membrane, or film from an external impact and securing scratch resistance against friction.

At this time, to increase adhesiveness with said other layer, membrane, or film, the surface of the first coating layer may be treated with plasma, corona discharge, or an alkaline solution such as sodium hydroxide or potassium hydroxide.

The plastic film of the present invention disclosed above is a multilayer plastic film including the coating layers having different elastic modulus range, and can exhibit not only high transparency and high hardness but also high impact resistance due to a plurality of coating layers effectively absorbing or offsetting an external impact. Therefore, it can be usefully applied to replacement of a cover glass used in touch panels of mobile terminals, smart phones or tablet PCs, a cover panel, or a device panel for various displays.

The plastic film of the present invention may be formed by coating the first to the fourth coating compositions on the supporting substrate or other coating layer and photo-curing the same.

Namely, the plastic film including 3 or 4 coating layers may be formed by coating the compositions for forming the coating layers which directly contact with the supporting substrate on the supporting substrate and photo-curing the same at first, and coating other coating composition on the cured coating layer again and curing the same, according to the structure of the film.

At this time, any method that is available in the art would be used in the application of the coating composition without particular limitations. For example, the coating composition may be applied by bar coating, knife coating, roll coating, blade coating, die coating, micro-gravure coating, comma coating, slot die coating, lip coating, solution casting, and the like.

And, when the coating composition is cured by UV radiation, the dosage of UV radiation may be about 20 to about 600 mJ/cm$^2$ or about 50 to about 500 mJ/cm$^2$. Any light source that can be used in the art would be applied to the present invention without particular limitation. For example, a high-pressure mercury lamp, a metal halide lamp, a black light fluorescent lamp and the like may be used. The photo-curing process may be carried out by irradiating UV light at above dosage for about 30 sec to about 15 min, or for about 1 to about 10 min.

For use as a cover for mobile terminals or tablet PCs, it is important to improve the hardness or impact resistance of the plastic film to the level of replacing glass. The coating layers of the present invention is less prone to curling or cracking even if it is formed with high thickness on the substrate, and thus the plastic film having high transparency and impact resistance can be obtained.

The plastic film of the present invention may have excellent hardness and impact resistance enough to replace glass. For example, the plastic film of the present invention may not crack even after the steel bead weighing 22 g is freely dropped ten times from the height of 60 cm thereto.

In addition, the second coating layer in the plastic film of the present invention may have a pencil hardness of 7H or more, 8H or more, or 9H or more at the load of 1 kg.

Furthermore, the second coating layer in the plastic film of the present invention may show only two or less scratches, after rubbing the same 400 times back and forth with a steel wool #0000 under the load of 500 g on a friction tester.

The plastic film of the present invention may have a light transmittance of about 91.0% or more, or about 92.0% or more, and a haze of about 1.0% or less, about 0.5% or less, or about 0.4% or less.

Furthermore, the plastic film of the present invention may show an initial color b value (b* by CIE 1976 L*a*b* color space) of about 1.0 or less. And, the difference between the initial color b and the color b measured after exposing the film to UV-B light from an ultraviolet lamp for 72 hrs or more may be about 0.5 or less, or about 0.4 or less.

And, when the plastic film of the present invention is disposed on a plane after exposing the same to a temperature of 50° C. or more and a humidity of 80% or more for 70 hrs, the maximum distance between the plane and each edge or side of the plastic film may be about 1.0 mm or less, about 0.6 mm or less, or about 0.3 mm or less. More particularly, when the plastic film of the present invention is disposed on a plane after exposing the same to a temperature of 50° C. to 90° C. and a humidity of 80% to 90% for 70 to 100 hrs, the maximum distance between the plane and each edge or side of the plastic film may be about 1.0 mm or less, about 0.6 mm or less, or about 0.3 mm or less.

The plastic film of the present invention exhibits excellent physical properties including hardness, impact resistance, scratch resistance, transparency, durability, light resistance, and light transmittance, and has useful applications in various fields. For example, the plastic film of the present invention can be used in various fields, for example, the touch panels of mobile terminals, smart phones or tablet PCs, and as covers or device panels for various displays.

A better understanding of the present invention may be obtained through the following examples which are set forth to illustrate, but are not to be construed as limiting the present invention.

EXAMPLES

Preparation Example 1: Preparation of Photo-Curable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether, and 315 g of methyl ethyl ketone. Then, the mixture was reacted at 70° C. for 5 hrs to obtain a polyrotaxane including cyclodextrin connected with a polylactone compound with an acrylate moiety introduced to the end thereof as a macrocycle.

The obtained polyrotaxane had the weight average molecular weight of 600,000 g/mol, and the elongation of 20% measured according to ASTM D638.

Example 1

A first coating composition was prepared by mixing 6 g of trimethylolpropane triacrylate (TMPTA), 4 g of the polyrotaxane prepared in Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A second coating composition was prepared by mixing 9 g of a silica-dipentaerythritolhexacrylate (DPHA) composite in which silica nanoparticles with a particle size of 20-30 nm were dispersed by about 40 wt % (silica 3.6 g, DPHA 5.4 g), 1 g of the polyrotaxane of Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone. A third coating composition was prepared by mixing 7 g of trimethylolpropane triacrylate (TMPTA), 3 g of the polyrotaxane prepared in Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The third coating composition was coated on one side of a PET supporting substrate having the thickness of 188 μm and the size of 15 cm×20 cm. Subsequently, a third coating layer of 50 μm thickness was prepared by exposing the coated composition to UV light of 280-350 nm by using a black light fluorescence lamp for photo-curing the same.

The first coating composition was coated on the third coating layer. Subsequently, a first coating layer of 50 μm thickness was prepared by exposing the coated composition to UV light of 280-350 nm by using a black light fluorescence lamp for photo-curing the same.

The second coating composition was coated on the other side of the supporting substrate. Subsequently, a second coating layer of 100 μm thickness was prepared by exposing the coated composition to UV light of 280-350 nm by using a black light fluorescence lamp for photo-curing the same.

Example 2

A first and a second coating compositions were prepared in the same manner as in Example 1.

A fourth coating composition was prepared by mixing 8 g of a silica-dipentaerythritolhexacrylate (DPHA) composite in which silica nanoparticles with a particle size of 20-30 nm were dispersed by about 40 wt % (silica 3.2 g, DPHA 4.8 g), 2 g of the polyrotaxane of Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The first coating composition was coated on one side of a PET supporting substrate having the thickness of 188 μm and the size of 15 cm×20 cm. Subsequently, a first coating layer of 100 μm thickness was prepared by exposing the coated composition to UV light of 280-350 nm by using a black light fluorescence lamp for photo-curing the same.

The fourth coating composition was coated on the other side of the supporting substrate. Subsequently, a fourth coating layer of 50 μm thickness was prepared by exposing the coated composition to UV light of 280-350 nm by using a black light fluorescence lamp for photo-curing the same.

The second coating composition was coated on the fourth coating layer. Subsequently, a second coating layer of 50 μm thickness was prepared by exposing the coated composition to UV light of 280-350 nm by using a black light fluorescence lamp for photo-curing the same.

Example 3

A first, a second, and a third coating compositions were prepared in the same manner as in Example 1.

A fourth coating composition was prepared by mixing 8 g of a silica-dipentaerythritolhexacrylate (DPHA) composite in which silica nanoparticles with a particle size of 20-30 nm were dispersed by about 40 wt % (silica 3.2 g, DPHA 4.8 g), 2 g of the polyrotaxane of Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The third coating composition was coated on one side of a PET supporting substrate having the thickness of 188 μm and the size of 15 cm×20 cm. Subsequently, a third coating layer of 50 μm thickness was prepared by exposing the coated composition to UV light of 280-350 nm by using a black light fluorescence lamp for photo-curing the same.

The first coating composition was coated on the third coating layer. Subsequently, a first coating layer of 50 μm thickness was prepared by exposing the coated composition to UV light of 280-350 nm by using a black light fluorescence lamp for photo-curing the same.

The fourth coating composition was coated on the other side of the supporting substrate. Subsequently, a fourth coating layer of 50 μm thickness was prepared by exposing the coated composition to UV light of 280-350 nm by using a black light fluorescence lamp for photo-curing the same.

The second coating composition was coated on the fourth coating layer. Subsequently, a second coating layer of 50 μm thickness was prepared by exposing the coated composition to UV light of 280-350 nm by using a black light fluorescence lamp for photo-curing the same.

Example 4

A first coating composition was prepared by mixing 6 g of trimethylolpropane triacrylate (TMPTA), 4 g of a urethane acrylate polymer (proprietary name: UA340P, Shinnakamura Chemicals Corp., weight average molecular weight: 13,000 g/mol, elongation measured according to ASTM D638: 150%), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A second coating composition was prepared by mixing 9 g of a silica-dipentaerythritolhexacrylate (DPHA) composite in which silica nanoparticles with a particle size of 20-30 nm were dispersed by about 40 wt % (silica 3.6 g, DPHA 5.4 g), 1 g of a urethane acrylate polymer (UA340P), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A third coating composition was prepared by mixing 7 g of trimethylolpropane triacrylate (TMPTA), 3 g of a urethane acrylate polymer (UA340P), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A fourth coating composition was prepared by mixing 8 g of a silica-dipentaerythritolhexacrylate (DPHA) composite in which silica nanoparticles with a particle size of 20-30 nm were dispersed by about 40 wt % (silica 3.2 g, DPHA 4.8 g), 2 g of a urethane acrylate polymer (UA340P), 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

The third coating composition was coated on one side of a PET supporting substrate having the thickness of 188 μm and the size of 15 cm×20 cm. Subsequently, a third coating layer of 50 μm thickness was prepared by exposing the coated composition to UV light of 280-350 nm by using a black light fluorescence lamp for photo-curing the same.

The first coating composition was coated on the third coating layer. Subsequently, a first coating layer of 50 μm thickness was prepared by exposing the coated composition to UV light of 280-350 nm by using a black light fluorescence lamp for photo-curing the same.

The fourth coating composition was coated on the other side of the supporting substrate. Subsequently, a fourth coating layer of 50 μm thickness was prepared by exposing the coated composition to UV light of 280-350 nm by using a black light fluorescence lamp for photo-curing the same.

The second coating composition was coated on the fourth coating layer. Subsequently, a second coating layer of 50 μm thickness was prepared by exposing the coated composition to UV light of 280-350 nm by using a black light fluorescence lamp for photo-curing the same.

Comparative Example 1

A first and a second coating compositions were prepared by mixing 9 g of a silica-dipentaerythritolhexacrylate (DPHA) composite in which silica nanoparticles with a particle size of 20-30 nm were dispersed by about 40 wt % (silica 3.6 g, DPHA 5.4 g), 1 g of the polyrotaxane of Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A third coating composition and the other details about the preparation of the plastic film were the same as in Example 1.

Comparative Example 2

A first coating composition was prepared by mixing 9 g of a silica-dipentaerythritolhexacrylate (DPHA) composite in which silica nanoparticles with a particle size of 20-30 nm were dispersed by about 40 wt % (silica 3.6 g, DPHA 5.4 g), 1 g of the polyrotaxane of Preparation Example 1, 0.2 g of a photoinitiator (proprietary name: Darocur TPO), 0.1 g of a benzotriazole-based yellowing inhibitor (proprietary name: Tinuvin 400), 0.05 g of a fluorine surfactant (proprietary name: FC4430), and 1 g of methylethylketone.

A second to a fourth coating compositions and the other details about the preparation of the plastic film were the same as in Example 4.

The elastic moduli of each layer in the plastic films of Examples 1 to 4 and Comparative Examples 1 and 2 are summarized in Table 1, below.

TABLE 1

| | Elastic Modulus of first Coating Layer (unit: MPa) | Elastic Modulus of second Coating Layer (unit: MPa) | Elastic Modulus of third Coating Layer (unit: MPa) | Elastic Modulus of fourth Coating Layer (unit: MPa) |
|---|---|---|---|---|
| Example 1 | 600 | 2500 | 1150 | — |
| Example 2 | 600 | 2500 | — | 2200 |
| Example 3 | 600 | 2500 | 1150 | 2200 |
| Example 4 | 400 | 2350 | 850 | 1930 |
| Comparative Example 1 | 2500 | 2500 | 1150 | — |
| Comparative Example 2 | 2500 | 2350 | 850 | 1930 |

TEST EXAMPLES

Measuring Methods

1) Pencil Hardness

Pencil hardness was evaluated according to the Japanese Standard JIS K5400. In this regard, a pencil hardness meter was reciprocated three times on the second coating layer of each of the plastic films under a load of 1.0 kg to determine the hardness at which no scratches appeared.

2) Scratch Resistance

After being loaded to a friction tester, a steel wool (#0000) was reciprocated 400 times on the second coating layer of each of the plastic films under a load of 0.5 kg, and scratches thus formed were counted. Evaluation was made of the scratch resistance of the films by marking ○ for two or less scratches, Δ for three to less than five scratches, and X for five or more scratches.

3) Light Resistance

Differences in color b value of the plastic films before and after exposure to UV-B light from an UV lamp for 72 hrs were measured.

4) Transmittance and Haze

Transmittance and haze were measured by using a spectrophotometer (equipment name: CHO-400))

5) Curl Property at High Humidity and Temperature

After a plastic film piece with dimensions of 10 cm×10 cm was stored for 72 hrs in a chamber maintained at the temperature of 85° C. and the humidity of 85%, it was placed on a flat plane. It was evaluated as OK when the distance between one side of each edge of the piece and the plane was 1 mm or less and as X when the distance was over 1 mm.

6) Cylindrical Bending Test

Each of the plastic films was wound on a cylindrical mandrel having a diameter of 3 cm so that the first coating layer was toward outside. It was evaluated as OK when the plastic film was not cracked and as X when the plastic film was cracked.

7) Impact Resistance

The impact resistance of the second coating layer of each of the plastic films was evaluated by determining whether or not each of the plastic films was cracked when a 22 g steel ball was freely dropped 10 times thereon from a height of 60 cm. Each of the plastic films was evaluated as OK when it was not cracked, and as X when it was cracked.

The results of the measured properties are summarized in Table 2 below.

TABLE 2

| | Examples | | | | Comparative Examples | |
|---|---|---|---|---|---|---|
| | 1 | 2 | 3 | 4 | 1 | 2 |
| Pencil hardness | 8H | 9H | 8H | 8H | 8H | 8H |
| Scratch resistance | ○ | ○ | ○ | ○ | ○ | ○ |
| Light resistance | 0.17 | 0.22 | 0.24 | 0.26 | 0.20 | 0.24 |
| Transmittance | 92.1 | 92.3 | 92.0 | 92.3 | 92.0 | 92.1 |
| Haze | 0.4 | 0.3 | 0.3 | 0.2 | 0.3 | 0.3 |
| Bending test | OK | OK | OK | OK | X | X |
| Curl property at high humidity & temperature | OK | OK | OK | OK | OK | OK |
| Impact resistance | OK | OK | OK | OK | X | X |

As shown in Table 2, the plastic films of the present invention according to Examples 1 to 4 have the structure of that at least two layers having different elastic modulus from each other are laminated on both sides of the supporting substrate. Here, it is recognizable that the second coating layer having relatively high elastic modulus exhibits high physical properties such high hardness and the first coating layer having relatively low elastic modulus contributes to impact resistance and folding endurance and thus the plastic films can show excellent processability while having high physical strength sufficient to be a substitute for glass.

However, the films according to Comparative Examples 1 and 2 include the first coating layer of which the elastic modulus is 2000 MPa or less and the difference between the first coating layer and the second coating layer is less than 500 MPa. The difference is too small for the films to exhibit sufficient impact resistance against an external impact, and flexibility thereof is insufficient too.

DESCRIPTION OF SYMBOLS

10: a first coating layer
20: a second coating layer
30: a third coating layer
40: a fourth coating layer
50: a supporting substrate

What is claimed is:
1. A plastic film, including:
a supporting substrate;
a first coating layer which is formed on one side of the supporting substrate and has an elastic modulus of 1,500 MPa or less;
a second coating layer which is formed on another side of the supporting substrate and has an elastic modulus of 2,000 MPa or more; and
at least one layer selected from: (i) a third coating layer located between the supporting substrate and the first coating layer; and (ii) a fourth coating layer located between the supporting substrate and the second coating layer, and wherein each of (i) the first coating layer, (ii) the second coating layer, and (iii) the at least one layer selected from the third and the fourth coating layers, includes a photo-curable crosslinking copolymer of a photo-curable elastic polymer and a 3- to 6-functional acrylate monomer.

2. The plastic film according to claim 1,
wherein the plastic film includes a third coating layer and a fourth coating layer,
wherein an elastic modulus of the third coating layer is equal to or higher than the elastic modulus of the first coating layer,
and wherein an elastic modulus of the fourth coating layer is equal to or lower than the elastic modulus of the second coating layer.

3. The plastic film according to claim 2, wherein the elastic modulus of the third coating layer is 2000 MPa or less.

4. The plastic film according to claim 2, wherein the elastic modulus of the fourth coating layer is 1500 MPa or more.

5. The plastic film according to claim 1, wherein the photo-curable crosslinking copolymer is a crosslinking copolymer in which a 1- to 2-functional acrylate monomer is crosslinked in addition to the 3- to 6-functional acrylate monomer and the photo-curable elastic polymer.

6. The plastic film according to claim 1, wherein the photo-curable elastic polymer has an elongation of 15 to 200% as measured according to ASTM D638.

7. The plastic film according to claim 6, wherein the photo-curable elastic polymer includes at least one selected from the group consisting of polycaprolactone, urethane acrylate polymers, and polyrotaxane, independently equally or differently.

8. The plastic film according to claim 7, wherein the polyrotaxane includes a macrocycle connected with a lactone compound with a (meth)acrylate moiety introduced to the end thereof; a linear compound passing through the macrocycle; and stopper groups placed at both ends of the linear compound so as to prevent the macrocycle from dissociation.

9. The plastic film according to claim 1, wherein each of the first coating layer, the second coating layer, and the at least one of the third and the fourth coating layers includes inorganic particles dispersed in the photo-curable crosslinking copolymer.

10. The plastic film according to claim 9, wherein each of the first coating layer, the second coating layer, and the at least one of the third and the fourth coating layers includes 40 to 90 parts by weight of the photo-curable crosslinking copolymer and 10 to 60 parts by weight of the inorganic particles, based on 100 parts by weight of the first to the fourth coating layers.

11. The plastic film according to claim 1, wherein the 3- to 6-functional acrylate monomer includes at least one selected from the group consisting of trimethylolpropane triacrylate (TMPTA), trimethylolpropaneethoxy triacrylate (TMPEOTA), glycerin-propoxylated triacrylate (GPTA), pentaerythritol tetraacrylate (PETA), and dipentaerythritol hexaacrylate (DPHA).

12. The plastic film according to claim 1, including the first and the third coating layers on one side of the supporting substrate and the second coating layer on the other side of the supporting substrate, wherein the sum of the thicknesses of the first and the third coating layers is 50 to 300 μm and the thickness of the second coating layer is 50 to 300 μm.

13. The plastic film according to claim 12, wherein a ratio of the thicknesses of the first coating layer and the third coating layer is 99:1 to 5:5.

14. The plastic film according to claim 1, including the first coating layer on one side of the supporting substrate and the second and the fourth coating layer on the other side of the supporting substrate, wherein a sum of thicknesses of the second and the fourth coating layers is 50 to 300 μm and a thickness of the first coating layer is 50 to 300 μm.

15. The plastic film according to claim 14, wherein the ratio of the thicknesses of the second coating layer and the fourth coating layer is 99:1 to 5:5.

16. The plastic film according to claim 1, wherein the plastic film does not crack after a steel bead weighing 22 g is freely dropped ten times from a height of 60 cm thereto.

17. The plastic film according to claim 1, wherein the plastic film shows a pencil hardness of 7H or more at the load of 1 kg.

18. The plastic film according to claim 1, wherein a maximum distance between a plane and each edge or side of the plastic film is 1.0 mm or less, when the film is disposed on the plane after exposure to a temperature of 50° C. or more and a humidity of 80% or more for 70 hrs.

19. The plastic film according to claim 1, further including at least one layer selected from the group consisting of a plastic resin film, an adhesive film, a release film, a conductive film, a conductive layer, a coating layer, a curable resin layer, a non-conductive film, a metal mesh layer, and a patterned metal layer on the first coating layer or the second coating layer.

\* \* \* \* \*